United States Patent [19]
Bigley et al.

[11] Patent Number: 5,908,080
[45] Date of Patent: Jun. 1, 1999

[54] AUTOMATIC-MANUAL HUB LOCK SYSTEM

[75] Inventors: Jon A. Bigley, Canton, Mich.; Jeffrey E. Paulson; Ronald E. Began, both of Portland, Oreg.

[73] Assignee: Warn Industries, Inc., Milwaukie, Oreg.

[21] Appl. No.: 08/767,867

[22] Filed: Dec. 17, 1996

[51] Int. Cl.⁶ .................................................. F16D 11/00
[52] U.S. Cl. ...................... 180/247; 192/69.41
[58] Field of Search .................... 180/233, 244, 180/245, 246, 247; 192/69.4, 69.41, 69.43

[56] References Cited

U.S. PATENT DOCUMENTS

| | | | |
|---|---|---|---|
| 4,269,294 | 5/1981 | Kelbel | 192/69.43 |
| 4,627,512 | 12/1986 | Clohessy | 180/247 |
| 4,696,382 | 9/1987 | Aho | 192/69.43 |
| 4,811,824 | 3/1989 | Kurihara | 192/35 |
| 4,854,434 | 8/1989 | Kurihara | 192/35 |
| 4,928,804 | 5/1990 | Wakabayashi | 192/83 |
| 5,353,890 | 10/1994 | Clohessy | 180/247 |
| 5,445,258 | 8/1995 | Bigley et al. | 192/85 V |
| 5,520,272 | 5/1996 | Ewer et al. | 192/36 |
| 5,535,869 | 7/1996 | Bigley et al. | 192/69.41 |
| 5,586,632 | 12/1996 | Bigley et al. | 192/69.41 |

*Primary Examiner*—Kevin Hurley
*Attorney, Agent, or Firm*—Robert L. Harrington

[57] ABSTRACT

A hub locking system for a part-time four-wheel drive vehicle including a wheel hub, drive axle, and clutch meaner and an automatic actuator remotely operable by an operator to induce movement of the clutch member axially inwardly and a biasing means acting against the clutch member opposing operation of the automatic actuator to urge movement of the clutch member outwardly. A manual override allows manual operation when the automatic actuator is not actuated and includes a first member mounted for shifting axially inwardly and outwardly in the system and when shifted inwardly urges the clutch member against the force of the biasing means. A second member is mounted contiguous the first member and is manually rotatable. A ramp shaped cam is interposed between the first and second members and when the second member is rotated, it directly urges the first member to shift axially to actuate the clutch member.

29 Claims, 7 Drawing Sheets

AUTOMATIC-MANUAL HUB LOCK SYSTEM

BACKGROUND INFORMATION

1. Field of the Invention

This invention relates to improvements to hub-lock system for vehicles which are convertible between two-wheel and four-wheel drive, the hub lock system being actuated automatically or manually, and the manual portion of the system having a minimum number of operating parts for reliable operation.

2. Background of the Invention

Vehicles having four-wheel drive capability that are designed for on-road and off-road use typically provide optional engagement/disengagement of two of the four wheels. The wheels to be disengaged generally are provided with a drive line from a transfer case to the wheels. For on-road use and to avoid unnecessary energy consumption, and wearing of out-of-service drive line components, a first disconnect system disconnects the propeller shaft from the transfer case and a second disconnect system disconnects the axles from the wheels. This latter disconnect system is the hub lock system of the present invention.

Originally hub lock systems were manually actuated. A driver-operator would stop the vehicle, engage the transfer case disconnect system and then manually turn a dial located in each wheel hub to activate the hub lock. Subsequently, mechanism was developed to automatically activate the hub locks. Several versions of automatically actuated hub locks have been developed. One version relies on cam actuation whereby a cam mechanism is powered by rotation of the axles. Other systems involve pressure, or vacuum, actuated systems to shift a clutch member into position to provide interlock between the drive axle and the wheel, or to shift into a disconnected position. Further examples of automatic connect/disconnect systems include electromagnetic devices which also provide shifting of clutch members into connect or disconnect states.

Many four-wheel drive enthusiasts want both the convenience of automatic engagement/disengagement and the security of manual engagement. Prior patents illustrating hub lock systems having both automatic and manual actuation are U.S. Pat. Nos. 5,353,890 and 5,520,272.

Although the basic concept of having a hub lock system which may be automatically actuated from a remote location by a vehicle operator with a manual override thus is known generally, previous devices often have had more complex structure and more parts than may he desirable for positive operation and reliability from a maintenance standpoint. Such prior devices also may have been more expensive to manufacture due to their complexity.

SUMMARY OF THE INVENTION

The present invention provides a hub lock system for a part time four-wheel drive vehicle which has an automatic actuator remotely operable by a vehicle operator to induce movement of a clutch member axially therein between engaging and disengaging positions and a manual override that allows manual operation when the automatic actuator is not actuated. The manual override comprises a first member mounted for shifting axially inwardly and outwardly in the system and when shifted inwardly urges the clutch member to move axially inwardly against the force of a biasing means. A second member mounted axially outwardly on the wheel hub, contiguous to the first member, is accessible for manual rotation while remaining in a selected axial position. A ramp-shaped cam interposed between the first and second members is operable on rotation of the second member in one direction to positively urge the first member to shift axially inwardly, and upon rotation in the opposite direction allows the first member to shift axially outwardly.

The provision of a manual override actuation system with a minimum number of simply constructed elements provides for inexpensive manufacture and reliability in operation.

DESCRIPTION OF PREFERRED EMBODIMENT OF THE INVENTION

Figure 1:
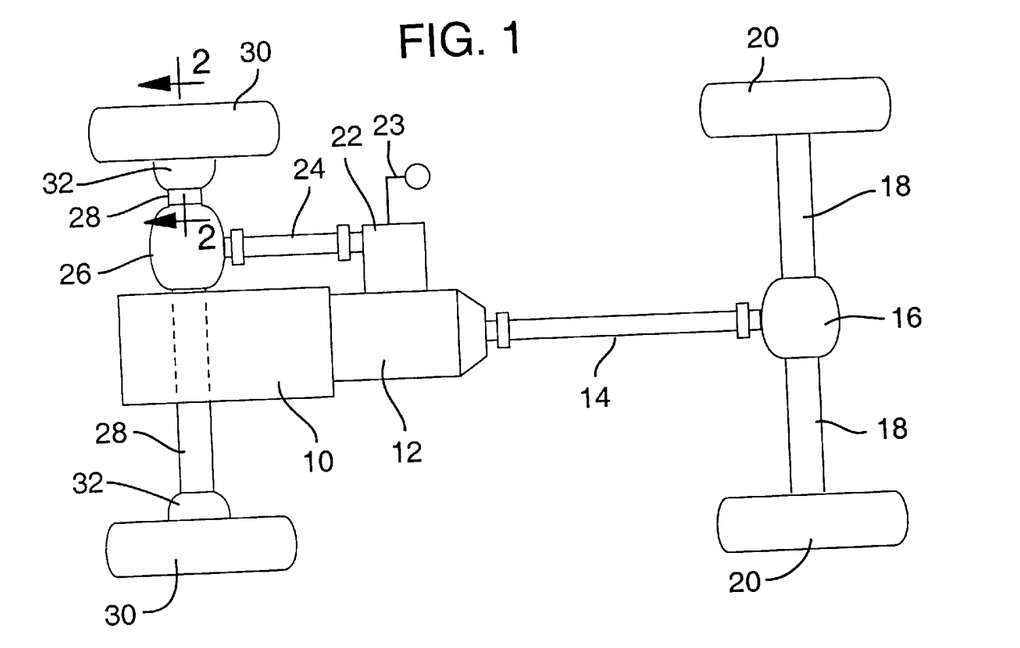
FIG. 1 is a schematic view of a vehicle as contemplated for incorporating the invention hereof.

FIG. 1 of the drawings illustrates generally the drive mechanism for a part-time four-wheel drive vehicle. The rotative power of the vehicle engine 10 is transmitted to the rear wheels 20 by transmission 12, rotating a propeller shaft 14 coupled to the rear differential 16. Axles 18 extending from differential 16 rotate rear wheels 20. The rotative power of engine 10 is transmitted to front wheels 30 by a transfer case 22 (coupled to transmission 12) that rotates a front propeller shaft 24 coupled to a front differential 26. Axles 28 extending from the differential 26 are adapted to rotate front wheels 30. The wheels 30 are mounted on hubs which are not visible in view in FIG. 1, but are illustrated in subsequent figures and further described hereafter.

As is known, the transfer case 22 has shift mechanism 23 to either provide rotative power to the front propeller shaft 24 or to disengage the same. Thus, the vehicle may be operated in two-wheel drive or four-wheel drive depending upon the shift selection of the transfer case. Although a shift selector external of the transfer case has been illustrated at 23, it should be recognized that automatic engaging mechanism in the transfer case also may be used to convert from two-wheel to four-wheel drive depending upon driving conditions.

The front wheels 30 are steerable and the vehicle is provided with steering knuckles, generally indicated at 32. The front axles 28, extending from the front differential 26 thus are provided with universal joints (not shown) to accommodate the steering capability.

Figure 2:
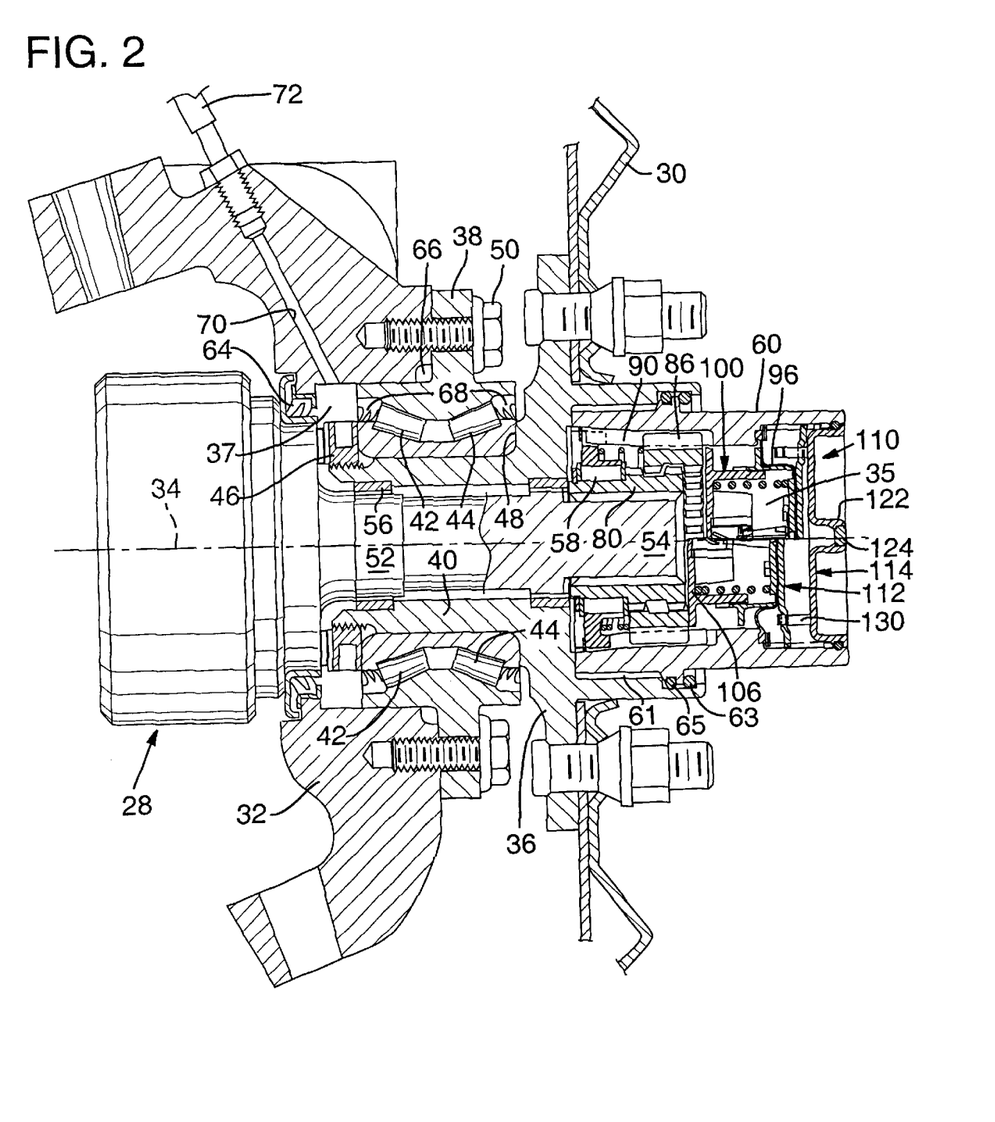
FIG. 2 is a cross sectional view taken along line 2—2 in FIG. 1 through a wheel hub and drive axle illustrating a form of automatic actuator and manual override according to the invention.

FIG. 2 illustrates a hub lock, or clutch, mechanism that couples or uncouples the right wheel 30 to axle 28 (only a portion of wheel 30 being shown). It will be understood that the axle 28 and wheel 30 can remain coupled and the vehicle shifted between two-wheel and four-wheel drive solely through the actuation of shift mechanism 23 in the transfer case. However, if the clutch mechanism remains coupled to the axles 28 when the vehicle is driven in two-wheel drive mode, wheels 30 will force rotation of the axles 28 and front propeller shaft 24 via the front differential 26. This is undesirable since it consumes power and causes unnecessary wear to that portion of the drive train. The front wheels 30 thus preferably are engaged with axle 28 only while operating the vehicle in four-wheel drive.

As indicated by view line 2—2 of FIG. 1, FIG. 2 shows the knuckle 32, a portion of axle 28, a portion of the wheel 30 and its mounting, and the clutch mechanism for coupling and uncoupling the wheel to the axle. The wheel mounting is of the live spindle type. As the term is used herein, the spindle is the support member that provides the bearing support for the wheel. It can be fixed to or be a part of the knuckle and functions as a bearing sleeve around which the wheel hub rotates, referred to as a dead spindle. Alternately, it can be fixed to or be a part of the hub of the wheel and function as a bearing sleeve that is rotatably supported in a bearing mount provided in the knuckle, referred to as a live spindle. As illustrated, the spindle of the present embodiment is a portion 40 of an integral, or combined, structure including a mounting hub 36 for a wheel 30 and a housing 60 that houses the clutch mechanism.

The spindle 40 of the integral structure is rotatably supported by a bearing pack 38 fixedly mounted to the knuckle by fasteners 50. The bearing pack is considered to be an integral portion of knuckle 32 when affixed by the fasteners. Alternately, it could be formed as a portion thereof. The spindle 40 is rotatably supported in the bearing pack 38 on bearings 42, 44. The spindle 40 (and thus the entire integral structure) is secured in the bearing pack by a nut 46, threadably installed on the end of spindle 40. Nut 46 engages the inner race of the bearing pack to clamp the inner race against shoulder 48 of the spindle as shown.

As seen in FIG. 2, an end portion 52 of axle 28 extends into spindle 40. An externally splined end 54 of portion 52 of the axle 28 extends into housing 60. Housing 60 is configured to house the clutch mechanism and will hereafter be referred to as a hub clutch housing, or simply a clutch housing, 60.

Meshed splines 41, 61 on spindle 40 and housing 60, respectively cause the two to rotate together. A retaining ring 63 secures housing 60 to spindle 40, and an elastomeric 0-ring 65 provides on air-tight seal therebetween.

The end portion 52 of axle 28 is rotatably supported on bearings 56, 58. The combined structure of spindle 40, hub 36, and clutch housing 60 thus is rotatably mounted to the knuckle 32 and end portion 52 of axle 26 is independently mounted to the inside wall of spindle 40 so as to have a common axis of rotation 34.

The axle 28 and the integral structure of spindle 40, hub 36 and housing 60 are either coupled to rotate together, or uncoupled, to have independent rotation. This is accomplished by a hub lock clutch mechanism that, in the embodiment illustrated, is operable by fluid pressure, such as provided by air pressure which will be later explained.

Air must be supplied or removed from a chamber, or cavity, 35 provided in the wheel end for selective operation of the air-operated clutch mechanism. It is therefore necessary to provide a route, or circuit, for controlled air pressure, e.g. from the vehicle's motor to cavity 35.

The end portion 52 of axle 28 (within spindle 40) is sealed with respect to the knuckle 32 by a seal 64. The bearing pack 38 preferably is sealed with respect to the knuckle 32 by seals 66, 68. An interior air-tight cavity 37 is thereby established by the knuckle, bearing pack and seals 64, 66, 68, with the cavity having an inlet port 70 which feeds through various openings in the mechanism to chamber 35. A connecting line 72 is connected to a suitable air source on the vehicle, such as a negative air pressure provided by the intake manifold of the vehicle engine, by an appropriate valving system which may be remotely controlled by the vehicle user. An explanation of such a valve system is provided in commonly assigned U.S. Pat. No. 4,627,512.

Figure 4:
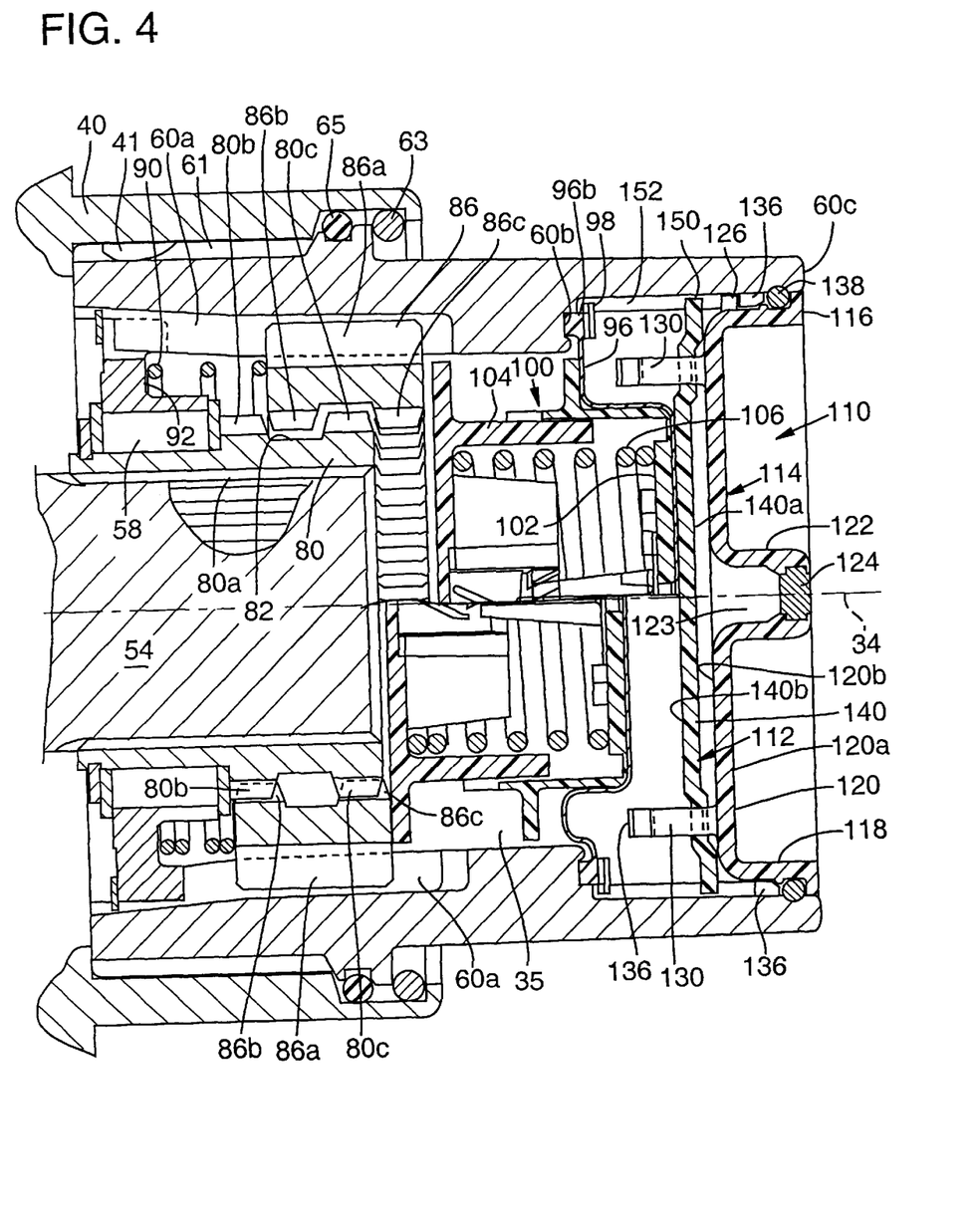
FIG. 4 is an enlarged cross sectional view through the outer end portion of the hub lock system in which the upper half illustrates the clutch mechanism disengaged, or unlocked, and the lower section illustrates the automatic actuator having shifted the clutch mechanism into an engaged, or locked, condition.
Figure 5:
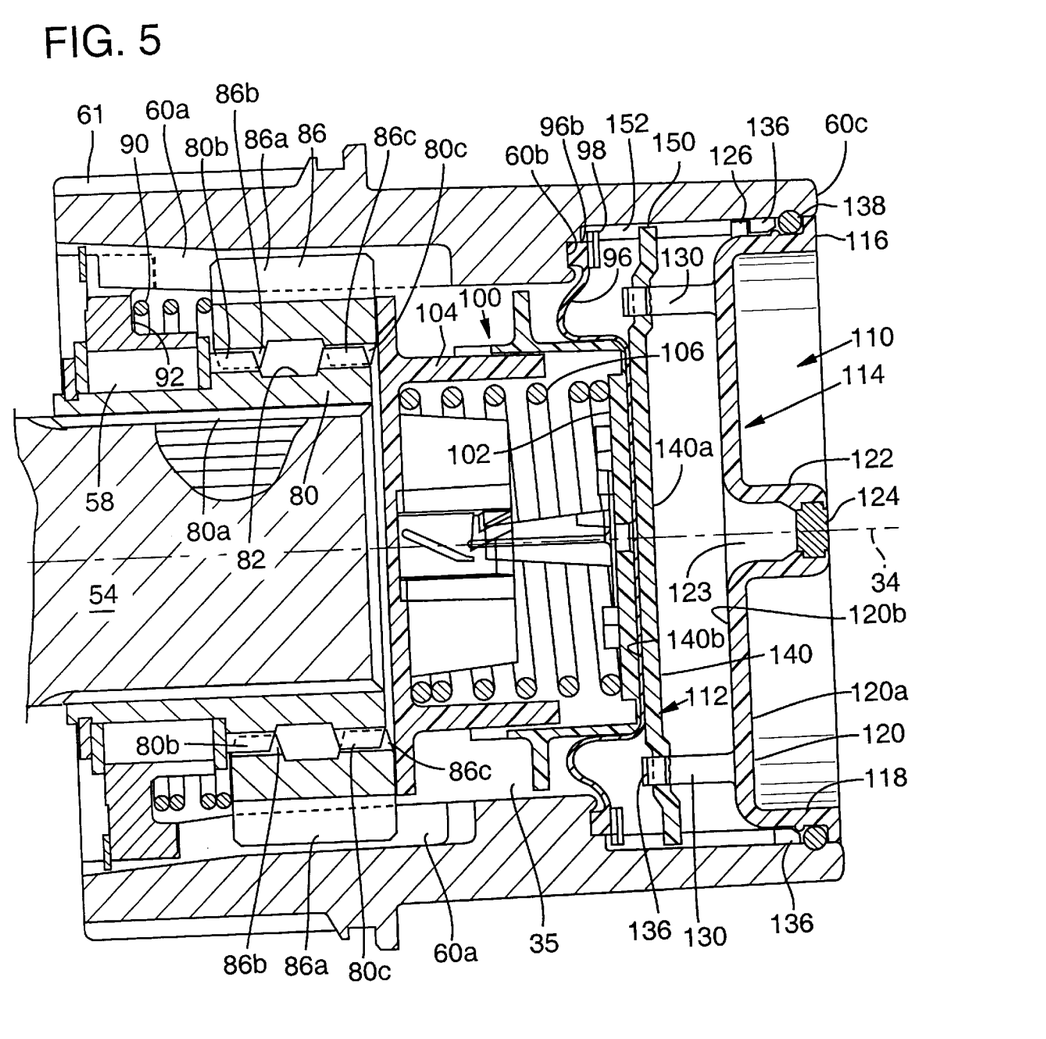
FIG. 5 is a cross sectional view similar to FIG. 4 with the manual override actuated to shift the clutch member to its engaged condition.
Figure 6:
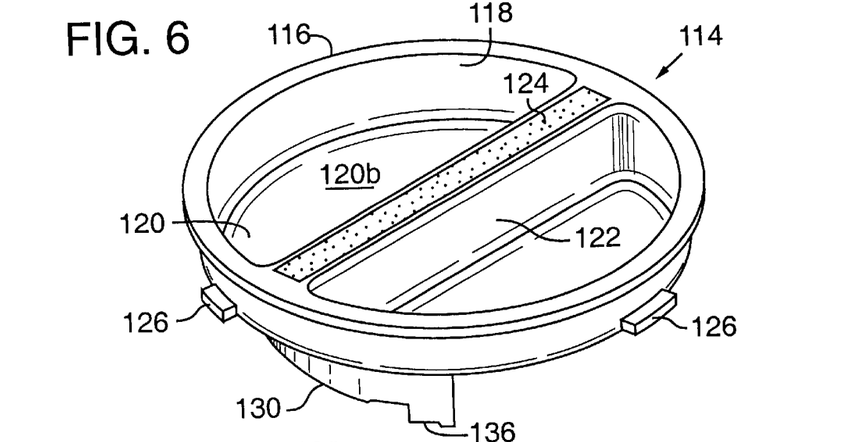
FIG. 6 is a perspective view of an axially outwardly directed surface, or portion, of the dial member of the manual override.

Referring now to FIGS. 4 and 5, these illustrate schematically the operation of an air-actuated interlock mechanism adapted for use in the present invention. Only those components necessary for an understanding of the operation are illustrated and discussed herein.

As previously explained, an end portion 54 of axle 28 extends into hub housing 60. Mounted on end portion 54 is a drive gear 80. The drive gear has inwardly directed splines 80a engaging splines on the outer surface of end 54 of the axle, whereby drive gear 80 rotates with axle 28. Also, the drive gear has two rows of outwardly directed gear teeth, 80b, 80c which have a space 82 therebetween.

A clutch ring 86 has outwardly directed splines 86a which engage axially directed splines 60a formed on a radially inwardly directed surface of hub housing 60. The clutch ring is slidably movable axially in the hub housing 60 but is locked into engagement with the hub housing for rotation therewith.

The clutch ring has two axially-spaced rows of gear teeth 86b, 86c, complementary to and adapted to mesh with gear teeth 80b, 80c. When the clutch ring is shifted to the position illustrated in the top portion of FIG. 4, gear teeth 86b, 86c are out of engagement with gear teeth 80b, 80c of drive gear 80 and the wheel hub is free to rotate independently of axle 28. However, when the clutch ring is shifted axially to the position illustrated at the lower half of FIG. 4, gear teeth 86b, 86c mesh with gear teeth 80b, 80c on the drive ring to produce driving engagement between axle 28, drive ring 80, clutch ring 86, and hub lock housing 60.

A return spring, or biasing means, 90 is interposed between a stationary shoulder 92 and clutch ring 86 to impose a pre-selected force on the clutch ring and urge the clutch ring to shift axially to the right in FIG. 4 and out of engagement with the drive gear.

A flexible diaphragm 96 is sealingly mounted at its somewhat bulbous peripheral edge 96a to a shoulder 60b of hub housing 60 spaced inwardly from its axially outermost end 60c. Diaphragm 96 encloses and forms one side of previously described chamber 35. In the configuration illustrated, a retaining ring 98, held in an annular groove in housing 60, secures the peripheral edge 96a of diaphragm 96 in the hub housing.

As is seen in FIG. 4, the central portion of diaphragm 96 is of such configuration that it is not stretched taut directly between its peripheral edge engagement with the housing. Instead it has a shape and flexibility to allow it to be shifted axially within the housing from the position illustrated at the top of FIG. 4 to the position illustrated at the bottom thereof.

A piston assembly 100 is interposed between diaphragm 96 and clutch ring 86. The piston assembly has a primary piston 102 in abutment with diaphragm 96 and a secondary piston 104 in abutment with the clutch ring. An engagement spring 106, which is stronger than spring 90, is captured between the primary piston 102 and secondary piston 104. The engagement spring urges the primary piston and the secondary piston to move axially away from each other.

By applying negative (lower than ambient) air pressure within chamber 35, diaphragm 96 is caused to shift inwardly from the position illustrated at the top of FIG. 4 to the position illustrated at the bottom of FIG. 4. When this occurs the piston assembly 100 is urged axially inwardly (to the left in FIG. 4) to shift clutch ring 86 from its non-engaged position, as illustrated at the top of FIG. 4, to its engaged position, as illustrated at the bottom of FIG. 4. In the non-engaged position gear teeth 80b, 80c are not meshed with gear teeth 86b, 86c, whereas they are meshed in the engaged position.

The actuating force of the diaphragm produced by the evacuation of chamber 35 is greater than the force exerted by spring 90 and thus overcomes the biasing force of spring 90 to compress it, as illustrated at the bottom of FIG. 4.

When the negative air pressure is released in chamber 35 and ambient, or nearer to ambient, pressure is resumed, spring 90 forces clutch ring 86, piston assembly 100 and diaphragm 96 to return to the position illustrated at the top portion of FIG. 4 whereby the clutch ring 86 again is disengaged from drive gear 80.

The mechanism and operation of this automatic actuation portion of the device has been described only summarily herein. Prior U.S. Pat. Nos. 4,627,512; 5,353,890; 5,520,272 and commonly-assigned U.S. patent application Ser. No. 08/485,784, filed Jun. 7, 1995 are incorporated herein by reference to disclose various automatic actuation systems for a hub lock which could be adapted for use in the present invention.

An automatic actuation system thus is provided for the hub lock system.

Although fluid, or air, actuated devises have been described in detail here, and in the documents incorporated by reference, it should be understood that other forms of automatic actuators, including mechanical, electromagnetic and others also are applicable. It should be recognized also that some forms of automatically-actuated devices which include fluid actuation may require an initial actuating pulse and then require a subsequent release pulse of a greater force to cause an unlatching operation to release the piston assembly and allow the clutch ring to return to its non-engaged position.

It is desirable to have the capability of engaging the clutch mechanism manually in the event of failure of the automatic actuation system. To provide the ability to manually operate the clutch mechanism, a manual override indicated generally at 110 constructed according to an embodiment of the present invention is provided. The manual override illustrated herein includes a first, disc-shaped actuator member 112 and a manually-operable second, or dial, member 114.

Referring to FIGS. 4–7, the dial, or second, member 114 is a circular, somewhat cup-shaped element having an external flange, or rim, 116, an axially-directed cylindrical wall 118 and a substantially planar central portion 120. The central portion has opposed inner and outer faces, or surfaces, 120a, 120b, respectively. Extending across the central region is an upstanding hollow gripping portion 122, which has a mesh filter 124 held therein. A hollow space 123 underlies filter 124. A plurality of lugs 126 project radially outwardly from wall 118 and are spaced axially from rim 116.

When assembled filter 124 allows ambient pressure to exist on the side of diaphragm 96 opposite chamber 35.

Figure 7:
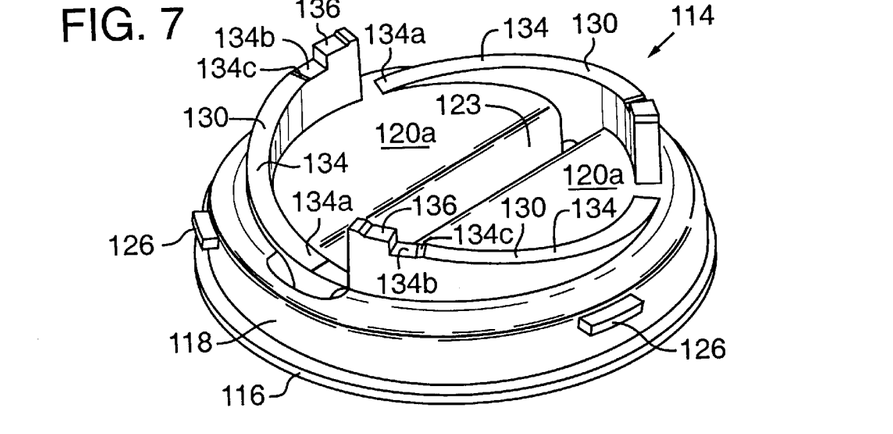
FIG. 7 is a perspective view of the axially inwardly directed surface, or portion, of the dial member.

Referring specifically to FIG. 7, a plurality of ramp-shaped cams 130 project axially from the rear surface 120a of central portion 120. As viewed axially of the element cams 130 are arcuate, each having the shape of part of a circle, and are arrayed at a substantially constant radius from the central axis of member 114.

The upper, or bearing, surface 134 of each cam has an initiating region 134a which is substantially flush with face 120a of central region 120. On progressing circumferentially about the member each bearing surface 134 extends progressively outwardly therefrom to region 134b. A stop 136, projects axially outwardly beyond region 134b. A slight rise 134c adjacent region 134b causes region 134b to form a slight detent between rise 134c and stop 136, the purpose for which will be discussed below.

Figure 3:
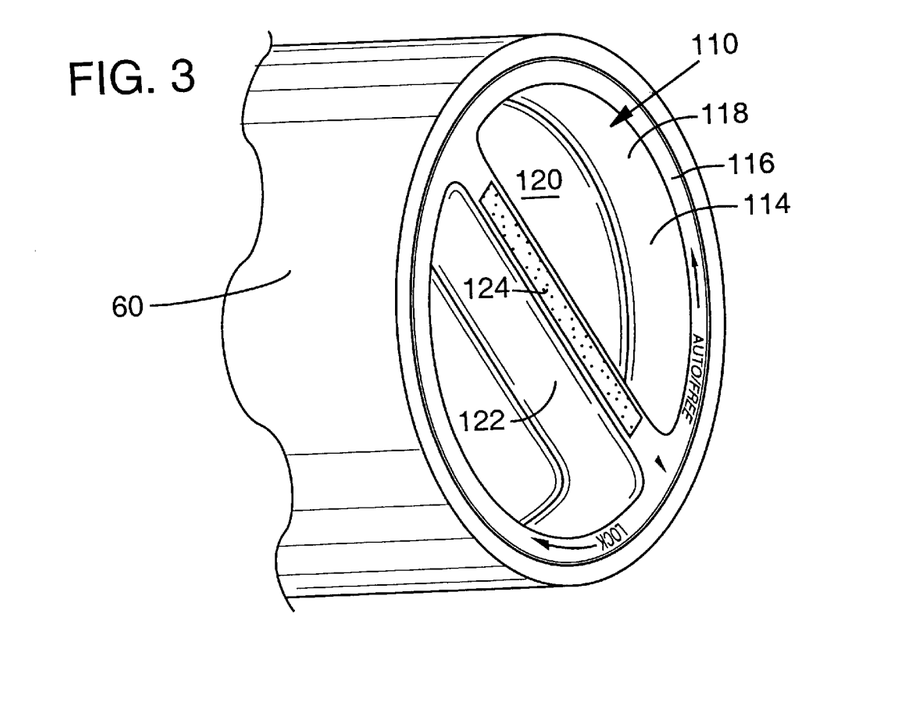
FIG. 3 is a perspective view of an outer end of the wheel hub illustrating the exposed portion which may be manually operated.

As viewed in FIGS. 3, 4 and 5, member 114 is mounted adjacent the axially outer end 60c of hub housing 60 with portion 122 exposed to be manually gripped by a user and rotated for operation. Lugs 126 on member 114 are positioned axially inwardly of a radially inwardly projecting rim 136 extending circumferentially about the inside of hub lock housing 60 to hold member 114 therein. An O-ring 138a, is positioned between rim 116 and rim 136. Member 114 thus is mounted in the hub lock housing with its central axis on axis 34 and for rotation about axis 34, but is restrained against axial movement relative to the hub housing.

Figure 8:
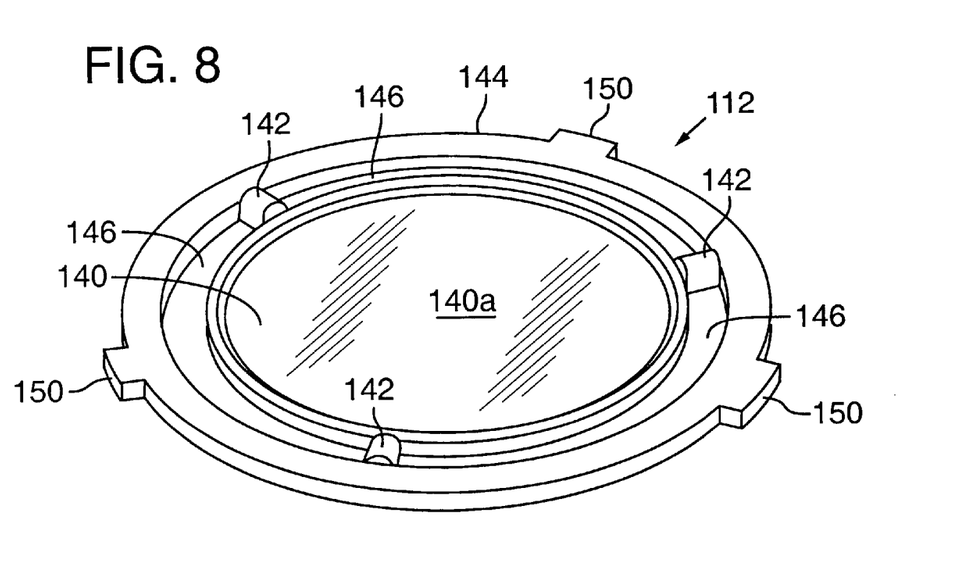
FIG. 8 is a perspective view of an actuator disc member of the manual override illustrating the face directed toward the dial member.
Figure 9:
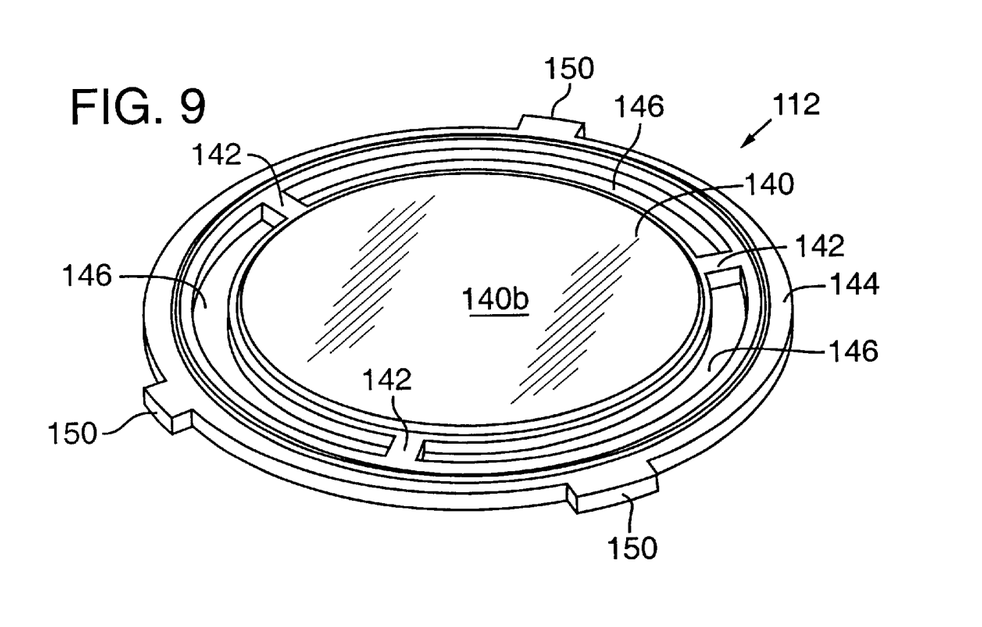
FIG. 9 is a perspective view of the opposite side of the disc member.

Actuator member 112 is best illustrated in FIGS. 4, 8 and 9. The member includes a disc-shaped central portion 140 having opposed, substantially planar faces or surfaces, 140a, 140b. Portion 140 is attached by radially extending circumferentially-spaced connectors, or cam followers, 142, to a surrounding ring 144. Arcuate slots 146 are provided between the peripheral edge of central portion 140, ring 144, and cam followers 142. A plurality of lugs 150 project radially outwardly from the outer edge of ring 144.

Slots 146 are complementary to the configuration of cams 130 in member 114. The two members thus may nest in contiguous relation as shown in FIG. 10, with cams 130 projecting through slots 146.

The projecting lugs 150 on member 112 are received in circumferentially spaced apart axial grooves, such as that indicated at 152, on the inner surface of hub lock housing 60 in FIGS. 4 and 5. Member 112 being so mounted in housing 60 may shift axially within the hub lock housing, but is restrained against rotational movement relative to the housing.

Figure 10:
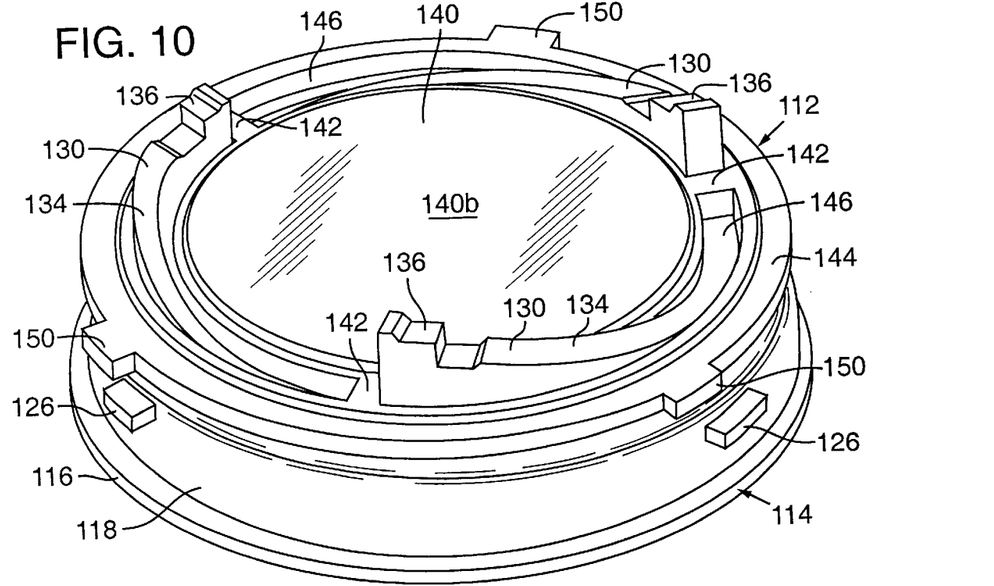
FIG. 10 is a perspective view of the dial member and actuator disc member in collapsed contiguous configuration as illustrated in FIG. 4.

In normal, non-operating condition, members 112, 114 of the manual override are in the positions illustrated in FIGS. 4 and 10 with members 112, 114 resting in substantially contiguous positions. To actuate the manual override, a user grips portion 122 of member 114 and rotates it clockwise.

Figure 11:
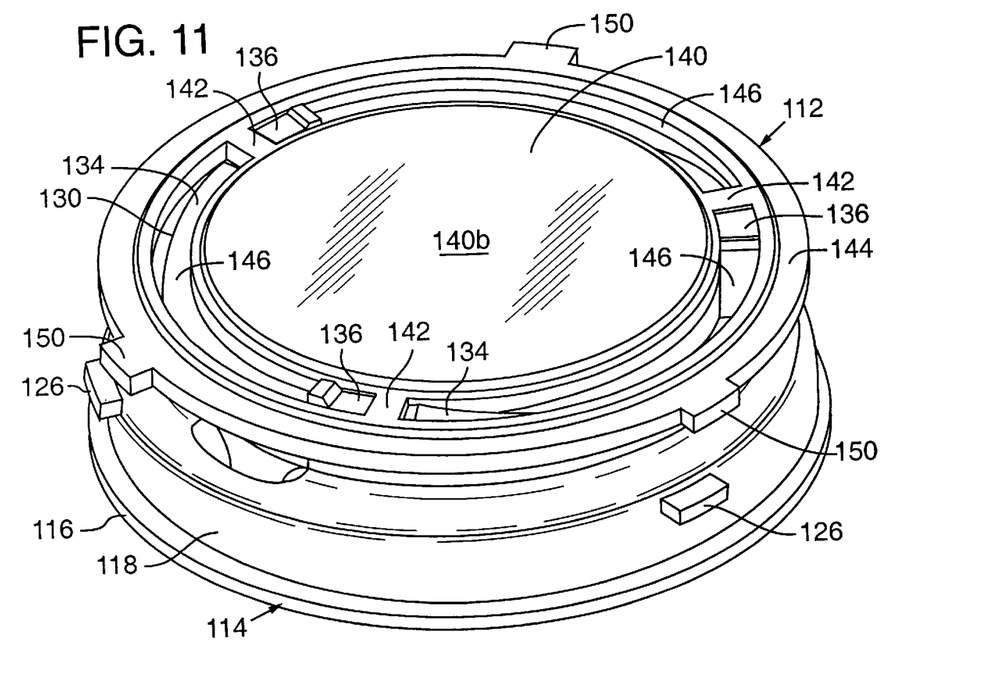
FIG. 11 is a perspective view similar to FIG. 10 with the dial member and actuator disc member shifted apart by rotation of the dial member to a position illustrated for the parts in FIG. 5.

The bearing surfaces 134 of cams 130 act against cam follower, or connector, portions 142 of member 112 to directly, or positively, urge member 112 to move axially inwardly (to the left in FIGS. 4 and 5) from the inoperative position illustrated in FIGS. 4 and 10 to the operative position illustrated in FIGS. 5 and 11. As this occurs, member 112 presses against diaphragm 96 and thus moves the diaphragm, piston assembly 100, and clutch ring 86 against the force of spring 90 toward their operative engaged position as illustrated in FIG. 5. Stops 136 on each of the cams are engaged by cam followers 142 to prevent overrotation of dial member 114. The slight detent at region 134b provided by rise 134c releasably holds member 112 in its actuated position.

Release of the manual override merely requires the operator to rotate dial member 114 in a counterclockwise direction, such that spring 90 may force clutch ring 86, piston assembly 100, diaphragm 96 and member 112 axially outwardly, to the right in the figures, toward its nested position against member 114 as shown in FIGS. 4 and 10.

Figure 7A:
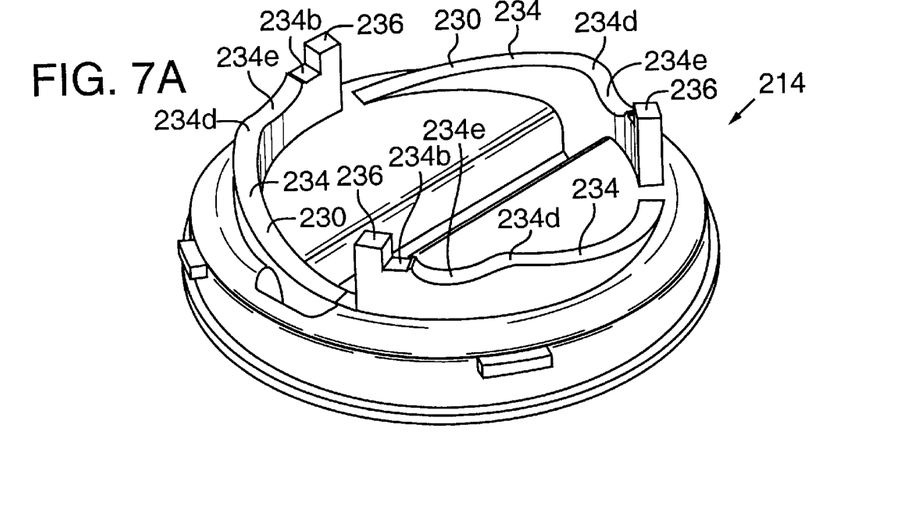
FIG. 7A is a view similar to FIG. 7 illustrating an alternate embodiment.

Referring to FIG. 7a, in this alternate embodiment of a dial member 214 the bearing surfaces 234 of cams 230 each have an extra rise and dip portion, with the extra rise being denoted 234d and the extra dip being denoted 234e preceding region 234b and stop 236. This configuration is such as may be used with an automatic actuation system wherein the piston assembly includes a form of latching mechanism which requires an additional inwardly-directed pulse to produce unlatching. Movement of cam followers 142 on actuator member 112 over the rise and dip 234d, 234e, respectively, may be sufficient to produce such required pulsing style movement.

While a preferred embodiment of the invention has been disclosed herein, it should be apparent to those skilled in the art that variations and modifications are possible without departing from the spirit of the invention.

I claim:

1. A hub locking system for a part-time four-wheel drive vehicle comprising
   a wheel hub, a drive axle, and a clutch member, each mounted for rotation about a drive axis, the clutch member being movable axially inwardly and outwardly relative to the wheel hub and drive axle between first and second positions for relative rotative interlocking and unlocking of the wheel hub to the drive axle,
   an automatic actuator remotely operable by a vehicle operator to induce movement of the clutch member axially inwardly from the one position to the other position, and biasing means acting against the clutch member and opposing the operation of the automatic actuator to urge movement of the clutch member axially outwardly, said biasing means generating less force than the automatic actuator when actuated whereby operation of the actuator overcomes the opposing force of the biasing means, and
   a manual override that allows manual operation when the automatic actuator is not actuated comprising a first member mounted for shifting axially inwardly and outwardly in the system, and when shifted inwardly to urge the clutch member to move axially inwardly against the force of the biasing means, and a second member mounted axially outwardly on the wheel hub contiguous said first member, said second member being manually rotatable about said axis and remaining in a selected axial position relative to the wheel hub upon rotation, with at least one ramp-shaped cam on one of said members interposed between the first and second members whereby upon rotation of the second member in one direction the cam urges the first member to shift axially inwardly and upon rotation in the opposite direction said first member is allowed to shift axially outwardly.

2. The system of claim 1, wherein said first member is substantially disk-shaped and has a face surface which engages said second member when shifted axially outwardly.

3. The system of claim 1, wherein said second member has a face directed toward said first member and said cam is mounted thereon and projects axially outwardly from remainder portions of said second member.

4. The system of claim 3, wherein a second ramp-shaped cam is mounted on said face of the second member and is spaced circumferentially from said first-mentioned cam.

5. The system of claim 3, wherein said cam has an arcuate configuration when viewed axially of the second member.

6. The system of claim 3, wherein said cam has a bearing surface directed toward said first member which progresses axially inwardly of the system on progressing circumferentially in one direction.

7. The system of claim 6, wherein said cam has a stop formed adjacent its axially innermost portion to restrict relative rotation between said first and second members to a pre-selected degree.

8. The system of claim 3, wherein said first member has a cam follower portion operatively engaging said cam.

9. The system of claim 1, wherein said first member is coupled to said hub whereby it is restrained against rotation about said axis but is shiftable axially relative to the hub.

10. The system of claim 1, wherein said actuator is operated by reduced air pressure and comprises a substantially air-tight chamber, one side of which chamber is closed by a flexible diaphragm coupled to the clutch member, and said biasing means comprises a spring positioned to urge the clutch member and diaphragm axially outwardly.

11. The system of claim 10, wherein said first member engages an axially outwardly facing surface of the diaphragm.

12. A combination automatic-manual hub lock system for providing driving connection/disconnection between an axle and a wheel on a vehicle comprising
    a hub lock housing,
    a clutch member mounted for rotation with and shiftable axially inwardly and outwardly relative to the hub lock housing to provide driving connection and disconnection between the axle and hub lock housing,
    an automatic actuator remotely operable by a vehicle operator to induce movement of the clutch member axially inwardly from the one position to the other position, and biasing means acting against the clutch member and opposing the operation of the automatic actuator to urge movement of the clutch member axially outwardly, said biasing means generating less force than the automatic actuator when actuated whereby operation of the actuator overcomes the opposing force of the biasing means,
    a manual override that allows manual operation when the automatic actuator is not actuated comprising a first member movable axially in the hub lock housing between inner and outer positions and coupled to said clutch member whereby shifting of the first member inwardly urges the clutch member to move against the urging of the biasing means toward its other position, and a second member mounted on the hub lock housing with a portion thereof exposed for manual rotation about the axis of the hub lock housing while remaining in a selected axial position upon rotation, and a ramp-shaped cam structure interposed between said first and second members whereby upon rotation of said second member said first member is urged to move away from a non-actuating position contiguous said second member axially inwardly toward an actuating position.

13. The system of claim 12, wherein said first member is coupled to said hub lock housing to permit axial movement of the second member but to restrain it against rotation.

14. The system of claim 13, wherein one of said members has a ramp-shaped cam formed thereon facing the other member and said other member has a cam follower portion which engages said cam, said cam and cam follower cooperating to urge said first member to move axially inwardly upon rotation of the second member in one direction.

15. The system of claim 14, wherein said cam is formed on and projects outwardly from a face of said second member, said first member has a slot formed therein for receiving said cam as the second member is rotated, and said cam follower is formed on said first member.

16. The system of claim 15, wherein said cam projects through said slot in said first member, and said cam follower is supported on an axially directed bearing surface of said cam.

17. The system of claim 16, wherein said cam and slot have complementary arcuate configurations as viewed axially.

18. The system of claim 16, wherein said first member comprises a disk, the cam and slot are disposed nearer the peripheral edges of said first and second members than to the centers thereof, with a portion of said cam projecting through the slot and beyond the side of said disk opposite said second member, and a central region of said first member provides an engaging portion to act against said clutch member.

19. The system of claim 18, wherein said actuator is operated by reduced air pressure and comprises a substantially air-tight chamber, one side of which chamber is closed by a flexible diaphragm coupled to the clutch member, a central portion of which diaphragm is shifted axially under the influence of changing air pressure in the chamber, and said central portion is disposed radially inwardly from said cam.

20. A manual actuator for a combination automatic-manual hub lock system operable to provide driving interconnection/disconnection between an axle and at wheel on a vehicle comprising
 a wheel hub provided for said wheel and a clutch ring engaged with one of said axle and wheel hub and movable axially inwardly relative to said wheel hub for engagement with the other of said axle and wheel hub, and an automatic actuator inducing movement of said clutch ring for automatic engagement and disengagement,
 a disk-shaped first member adapted to be mounted for movement axially in the wheel hub,
 a second member adapted to be mounted for manual rotation in such wheel hub contiguous said first member,
 a ramp-shaped cam on one of said members directed toward the other of said members and a cam follower on the other of said members adapted to rest against and be moved by an axially directed bearing surface of said cam, whereby rotation of said second member is operable to shift said first member axially inward and away from said second member.

21. The actuator of claim 20, wherein said cam is connected to and projects axially outwardly from said second member toward said first member, said first member has an arcuate slot formed therein for receiving said cam, and said cam follower is formed on said first member adjacent said slot.

22. The actuator of claim 21, wherein said cam when viewed axially of said second member has an arcuate configuration complementary to said arcuate slot.

23. The actuator of claim 20, wherein said first member has at least one tab projecting from its peripheral edge which is adapted to engage an axially disposed recess in a hub housing to permit axial movement of the first member, but to restrain rotation thereof.

24. The actuator of claim 20, wherein said second member has retaining portions thereon adapted to engage holding means on a hub housing to permit rotation of the second member, but to restrain axial movement thereof.

25. The actuator of claim 20, wherein said second member has a gripping portion adapted to be externally exposed when installed on a hub housing to permit manual rotation of said second member.

26. The actuator of claim 20, wherein said cam has a detent formed in its bearing surface adjacent its axially innermost region adapted to receive said cam follower to releasably hold said cam follower and its associated member.

27. The actuator of claim 26, wherein said cam has a stop potion adjacent said detent to prevent relative rotation beyond a pre-selected position between said first and second members.

28. A hub locking system for a part-time four-wheel drive vehicle comprising
 a wheel hub, a drive axle, and a clutch member, each mounted for rotation about a drive axis, the clutch member being movable axially inwardly and outwardly relative to the wheel hub and drive axle between first and second positions for relative rotative interlocking and unlocking of the wheel hub to the drive axle, and a biasing member biasing the clutch member outwardly,
 a first member mounted for shifting axially inwardly and outwardly in the system, and when shifted inwardly to urge the clutch member to move axially inwardly against the force of the biasing member, and a second member mounted axially outwardly on the wheel hub contiguous said first member, said second member being manually rotatable about said axis and remaining in a selected axial position relative to the wheel hub upon rotation, with at least one ramp-shaped cam on one of said members interposed between the first and second members whereby upon rotation of the second member in one direction the cam urges the first member to shift axially inwardly and upon rotation in the opposite direction said first member is allowed to shift axially outwardly,
 said wheel hub defining a cylindrical cavity encompassing substantially the entire outer end of the wheel hub as structurally permitted by the surrounding wall of the wheel hub, said second member including an outwardly facing cup-shaped element defining a cupped cavity extending laterally substantially the width of the cylindrical cavity, and a gripping portion spanning the cavity of the cupped cavity to provide maximum leverage for manual rotation of said second member.

29. A hub locking system for a part-time four-wheel drive vehicle comprising a wheel hub, a drive axle, and a clutch member, each mounted for rotation about a drive axis, the clutch member being movable axially inwardly and outwardly relative to the wheel hub and drive axle between first and second positions for relative rotative interlocking and unlocking of the wheel hub to the drive axle, an automatic actuator remotely operable by a vehicle operator to induce movement of the clutch member axially inwardly from the one position to the other position, said automatic actuator being air operated and having an expandable air chamber including a movable wall, and biasing means acting against the clutch member and opposing the operation of the automatic actuator to urge movement of the clutch member axially outwardly, said biasing means generating less force than the automatic actuator when actuated whereby operation of the actuator overcomes the opposing force of the biasing member, and a manual override that allows manual operation when the automatic actuator is not actuated comprising a first member mounted for shifting axially inwardly and outwardly in the system, and when shifted inwardly to urge the clutch member to move axially inwardly against the force of the biasing member, and a second member mounted axially outwardly on the wheel hub contiguous said first member, said second member being manually rotatable about said axis and remaining in a selected axial position relative to the wheel hub upon rotation, with at least one ramp-shaped cam on one of said members interposed between the first and second members whereby upon rotation of the second member in one direction the cam urges the first member to shift axially inwardly and upon rotation in the opposite direction said first member is allowed to shift axially outwardly, said wheel hub defining a cylindrical cavity at its outer end and outside the air chamber, said second member including an outwardly facing cup-shaped element defining a cavity and a gripping portion spanning the cavity of the cup-shaped element for manual rotation of said second member, and said gripping portion provided with a filter providing air passage to the cylindrical cavity that provides ambient pressure in the cavity of the wheel hub outside the chamber.

* * * * *